United States Patent [19]

Thrift

[11] Patent Number: 5,398,302
[45] Date of Patent: Mar. 14, 1995

[54] METHOD AND APPARATUS FOR ADAPTIVE LEARNING IN NEURAL NETWORKS

[76] Inventor: Philip Thrift, 9823 Summerwood Cir. Apt. 2004, Dallas, Tex. 75243

[21] Appl. No.: 52,275

[22] Filed: Apr. 22, 1993

Related U.S. Application Data

[63] Continuation of Ser. No. 943,972, Sep. 11, 1992, abandoned, which is a continuation of Ser. No. 769,749, Oct. 2, 1991, abandoned, which is a continuation of Ser. No. 477,017, Feb. 7, 1990, abandoned.

[51] Int. Cl.$^6$ .............................................. G06F 15/18
[52] U.S. Cl. ...................................................... 395/23
[58] Field of Search ......................................... 395/23

[56] References Cited

U.S. PATENT DOCUMENTS 4,912,651 3/1990 Wood et al. ......................... 364/513

OTHER PUBLICATIONS

Hash, D. R., Salas, J. M., "Improving the Learning Rate of Back-Propagation with the Gradient Reuse Algorithm.", from IEEE Int. Conf. on Neural Networks, Jul. 1988, pp. I-441-I-446.
Kollias, S. et al., "Adaptive Training of Multilayer Neural Networks Using a Least Squares Estimation Technique", from IEEE Intl. Conf. on Neural Networks, Jul. 1988, pp. I-383-I-390.
Lippmann, R. P., "An Introduction to Computing with Neural Nets.", IEEE ASSP Mag., Apr. 1987, pp. 4-22.
McClelland, J. L., Rumelhart, D. E, "Explorations in Parallel Distributed Processing", The Mit Press, 1988, pp. 121-152.
Fanelli, R. et al, "Neural Network Modelling of Eye Compensation During Off-Vertical-Axis Rotation", Neural Networks, vol. 3, 1990, pp. 265-276.
Vogl, et al., "Accelerationg the Convergence of the Back-Propagation Method," Biological Cybernetics, 59, pp. 257-263, (1988).
Jacobs, R. A., "Increased Rates of Convergence Through Learning Rate Adaptation," Neural Networks, vol. 1, (1988), pp. 295-307.
Dahl, E. D., "Accelerated Learning using the Generalized Delto Rule," Proceed. 1st Intl. Conf. on Neural Networks (1987), II-523-II-530.
Strang, G., Introduction to Applied Mathematics, Wellesley-Cambridg Press, (1986), pp. 367-424.
Chong et al., "Inplementation of Neural Networks for Speech Recognition on a Transputer Array"0 Cambridge University Dept. of Engineering, Mar. 1988.

*Primary Examiner*—Robert W. Downs
*Attorney, Agent, or Firm*—Tammy L. Williams; Richard L. Donaldson

[57] ABSTRACT

A method enabling a neural network, having weights organized into a weight vector, to learn, comprising the steps of: (a) assigning a first memory location for storing a first learning rate, a second memory location for storing a momentum factor, a memory block for storing the weight vector, and a third memory location for storing a second learning rate; (b) initializing the learning rate, momentum factor, and weight vector; (c) storing the first learning rate, the momentum factor, and the weight vector into their respective memory locations; (d) saving the first learning rate in the second learning rate by storing it into the third memory location; (e) using a search technique to adjust the first learning rate to adjust the weight vector, and updating the first memory location and the memory block; (f) adapting the momentum factor using the first learning rate and the second learning rate; and repeating steps (c) through (f) until a predetermined convergence criterion has been met.

10 Claims, 4 Drawing Sheets

METHOD AND APPARATUS FOR ADAPTIVE LEARNING IN NEURAL NETWORKS

This application is a continuation of application Ser. No. 07/943,972, filed Sep. 11, 1992, now abandoned, which is a continuation of application Ser. No. 07/769,749, filed Oct. 2, 1991, now abandoned, which is a continuation of application Ser. No. 07/477,017, filed Feb. 7, 1990, now abandoned.

FIELD OF THE INVENTION

The present invention relates generally to learning systems, and specifically to a method and apparatus for adaptively determining connection weights in neural networks.

BACKGROUND OF THE INVENTION

Increased usage of neural networks in a wide variety of applications has led to a substantial need for faster learning methods for determining connection weights in neural networks. Learning systems provide a way of deriving knowledge based upon a set of training examples rather than a set of rules. Learned knowledge evolves from the training examples dependent, in part, on the learning procedure being used.

Learning techniques using neural networks have been shown to be very useful for problem areas in which there are too many rules relating to the resolution of the problem, or in which all the rules are not known.

Neural networks have been used in many varied applications, such as visual pattern recognition, data compression, optimization techniques, expert systems applications as well as other situations involving complex problems or knowledge bases.

In visual pattern recognition a neural network learning system should be able to distinguish similar objects from each other, such as a tree from a utility pole, with a high degree of accuracy by showing a properly structured network enough examples. A system based on rules has a difficult time performing this relatively simple task because the person programming the rules cannot describe them in sufficient detail. Similar problems and potential neural network solutions exist with respect to speech recognition, particularly speaker-independent applications.

Learning systems also have been used to solve data encoder problems which involve "squeezing" data through a small number of hidden neurons in a neural network, and having the input data replicated at the output of the network. This implementation of neural network learning systems can be utilized to solve video compression problems involving vector quantization using a codebook lookup method, for example. The codebook used can be generated through the use of the learning system.

Neural network learning systems can be useful in finding optimal solutions for routing problems, for example, in communication applications involving traffic routing and scheduling, and in frequency allocation problems in cellular communications systems.

Expert knowledge sometimes is easier to encode by training examples rather than by providing a list of rules. Experts often do not know all the rules they use to trouble shoot equipment or give advice. A history of such action or advice can be used to develop a database of training examples to allow a system to "learn" the expert's knowledge. Furthermore, as knowledge changes, training often is a more efficient method of updating a knowledge base than changing the rules used. The knowledge base could be corrected or augmented without a new software release embodying the changed or different rules. This approach can be useful, for example, in the areas of medical diagnostics, common sense reasoning, trouble shooting procedures, installation instructions and software debugging.

The backpropagation algorithm, derived from the chain rule for partial derivatives, provides a gradient descent learning method in the space of weights, and has formed the foundation for many learning systems. The method of gradient descent can be improved by modifying it to a conjugate gradient method in which the current descent direction is determined by combining the gradient descent direction with an appropriate factor of the past descent direction. Generally, utilization of versions of the gradient descent learning algorithms in neural networks is based upon the selection of two parameters commonly known as the learning rate and the momentum factor. Calculation and determination of these parameters, however, often are cumbersome and not arrived at adaptively based on the progression of the learning method.

SUMMARY OF THE INVENTION

One object of the present invention is to provide an adaptive learning method and apparatus for neural networks.

Another object of the present invention is to provide a fast method for determining connection weights in neural networks.

Another object of the present invention is to provide a method and apparatus for adaptively determining the learning rate and momentum factor in a neural network.

The method of the present invention includes locating a search direction and determining a point along the search direction to modify the weights. The search direction is a unit vector determined as a composite of the previous search direction and the unit vector in the direction of gradient descent. The directional learning rate employed in the method of the present invention is determined by any known search technique which is preferably a simple version requiring relatively few line search steps, thereby enhancing system performance.

The search for the directional learning rate is commenced with the directional learning rate being set at the previous value. If the error is reduced using that directional learning rate, an attempt is made to reduce the error more by doubling the directional learning rate. This is then set as the new directional learning rate. If the error is not reduced, then the system proceeds using the old directional learning rate. If error is increased, the directional learning rate is halved until the error is reduced. Alternatively, the directional learning rate can be incremented or decremented by another suitable factor rather than simply doubling or halving the directional learning rate respectively.

The momentum factor is allowed to drift in a direction depending upon the direction of the change in learning rate. One alternative allows the momentum factor to drift between 0 and 1 in increments of, for example, 0.1 starting at 0.5. If the directional learning rate is not decreasing, then the momentum factor is allowed to drift in its current direction by the chosen increment. If the directional learning rate begins to decrease, then the momentum factor drift changes direction by the chosen increment.

BRIEF DESCRIPTION OF THE DRAWINGS

The present invention as well as other features and advantages of the invention will be understood best by reference to the following detailed description read in conjunction with the accompanying drawings, in which.

DETAILED DESCRIPTION OF THE PREFERRED EMBODIMENT

Figure 1:
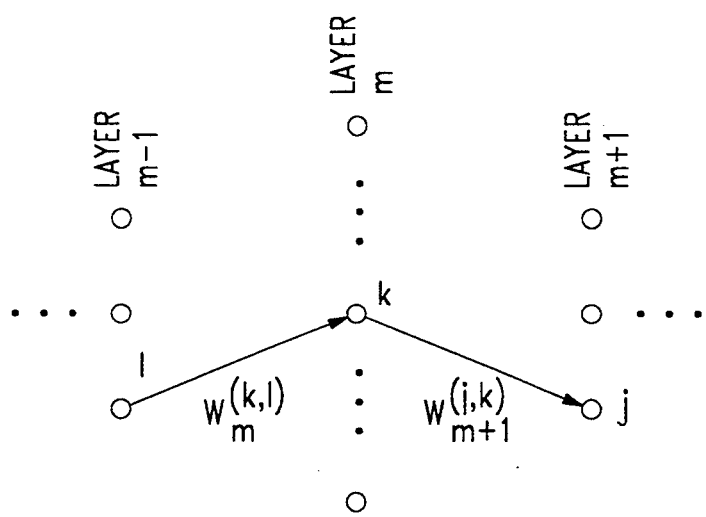
FIG. 1 a schematic representation of a neural network utilizing the present invention.

In the feedforward multi-layer neural network shown in FIG. 1, it is assumed there are a number of neurons at each layer of the network. The layers are indexed from 0 to n, with layer 0 being the input layer and n being the output layer. Each layer has an index variable associated with it. The range of the layer index variable is the neurons in that layer. Thus, in FIG. 1 l ranges over the neurons in layer m−1, k ranges over the neurons in layer m, and j ranges over the neurons in layer m+1. The number of neurons at layer m is represented by the symbol #(m). The output of neuron k at layer m is $o_m^{(k)}$. The synaptic weight from neuron k at layer m to neuron j at layer m+1 is $w_{m+1}^{(j,k)}$. Outputs at a layer of the network are assumed to be differentiable functions of a weighted sum of outputs at the previous layer. Letting $f_m^{(k)}$ be the transfer function at neuron k at layer m, the equations defining the dynamics of the network are:

$$\text{net}_m^{(k)} = \sum_l w_m^{(k,l)} o_{m-1}^{(l)} \quad (1)$$

$$o_m^{(k)} = f_m^{(k)}(\text{net}_m^{(k)}), \quad (2)$$

$$m = 1, \ldots, n.$$

Assuming the inputs $o_0^{(i)}$, i=1, ..., #(0) are given.

It is further assumed that it is desired to determine the gradient of a function of the output neurons as:

$$F = F(o_n^{(1)}, \ldots, o_n^{(\#(n))})$$

with respect to the interconnection weights. An application of the chain rule for partial derivatives as shown by Rumelhart, D. E., Hinton, G. E. and Williams, R. J., "Learning Internal Representations by Error Propagation", Parallel Distributed Processing, Vol. 1, MIT Press, 1986, provides:

$$\frac{\partial F}{\partial w_m^{(k,l)}} = \frac{\partial F}{\partial \text{net}_m^{(k)}} \cdot \frac{\partial \text{net}_m^{(k)}}{\partial w_m^{(k,l)}} \quad (3)$$

$$= \delta_m^{(k)} \cdot o_{m-1}^{(l)},$$

$$m = 1, \ldots, n$$

where $$\delta_m^{(k)} = \frac{\partial F}{\partial \text{net}_m^{(k)}}, \quad (4)$$

$$m = 1, \ldots, n.$$

For the output neurons $$\delta_n^{(i)} = \frac{\partial F}{\partial o_n^{(i)}} \cdot \frac{\partial o_n^{(i)}}{\partial \text{net}_n^{(i)}} \quad (5)$$

$$= \frac{\partial F}{\partial o_n^{(i)}} \cdot f_n^{(i)'}(\text{net}_n^{(i)}),$$

again using the chain rule. A final use of the chain rule gives:

$$\delta_m^{(k)} = \frac{\partial F}{\partial \text{net}_m^{(k)}} \quad (6)$$

$$= \sum_j \frac{\partial F}{\partial \text{net}_{m+1}^{(j)}} \cdot \frac{\partial \text{net}_{m+1}^{(j)}}{\partial \text{net}_m^{(k)}}$$

$$= f_m^{(k)'}(\text{net}_m^{(k)}) \cdot \sum_j \delta_{m+1}^{(j)} \cdot w_{m+1}^{(j,k)},$$

$$m = n-1, \ldots, 1$$

for the interior, or hidden, layers of the network. The last step follows from $$\text{net}_{m+1}^{(j)} = \sum_{\hat{k}} w_{m+1}^{(j,\hat{k})} \cdot f_m^{(\hat{k})}(\text{net}_m^{(\hat{k})}) \quad (7)$$

Equations 3, 5, and 6 provide the steps needed to compute the gradient direction in weight space for any differentiable function F of output neurons.

In the particular case where the function is the negative, or average, error function $$F = -\frac{1}{\#(n)} \sum_i (t^{(i)} - o_n^{(i)})^2, \quad (8)$$

where $t^{(i)}$ is the target value for output unit i, Equation (5) takes the form $$\delta_n^{(i)} = \frac{2}{\#(n)} (t^{(i)} - o_n^{(i)}) \cdot f_n^{(i)'}(\text{net}_n^{(i)}). \quad (9)$$

Letting F(p) denote the error for a particular input-target sequence indexed by p $$o_0^{(l)}(p), l=1, \ldots, \#(0), t^{(i)}(p), i=1, \ldots, \#(n)$$

Letting $\nabla_p w$ denote the gradient direction computed from the algorithm above for the p-th input-target sequence and function F(p). w is the vector of all weights in the network. The gradient direction computed by the backpropagation algorithm is the gradient descent direction for the error function, −F(p). For $$F = \sum_p F(p) \quad (10)$$

$$\nabla w = \sum_p \nabla_p w \quad (11)$$

The backpropagation algorithm thus computes $\nabla w$ from w by the following. At a particular weight setting w compute $\nabla_p w$ for each input-target sequence using Equations (9), (6), and (3). $\nabla w$ is then computed from Equation (11).

Neural network models generally include an offset value for each neuron, which are also selected. The inclusion of an offset term in the model modifies Equation 1 to be $$\text{net}_m^{(k)} = \sum_l w_m^{(k,l)} o_{m-1}^{(l)} + u_m^{(k)} \tag{12}$$

$$\tag{13}$$

This is no more general than the above model as can be shown by using the standard method of adding an extra neuron at every layer but the last, which is not connected to the previous layer, and whose output is always 1. If we let 0 be the index for these additional neurons, $$o_{m-1}{}^{(0)} = 1 \tag{14}$$

$$w_m{}^{(k,0)} = u_m{}^{(k)} \; m = 1, \ldots, n. \tag{15}$$

In general a #(0)-#(1)- . . . -#(n) network is a network with the additional units for offset.

Figure 2:
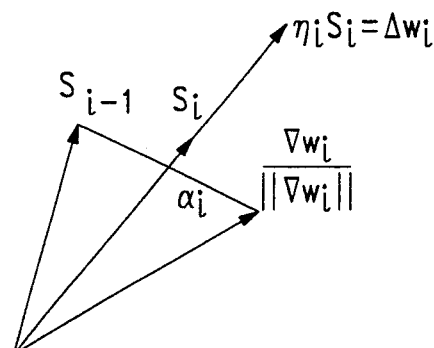
FIG. 2 is a geometric representation of the method of the present invention.
Figure 3A:
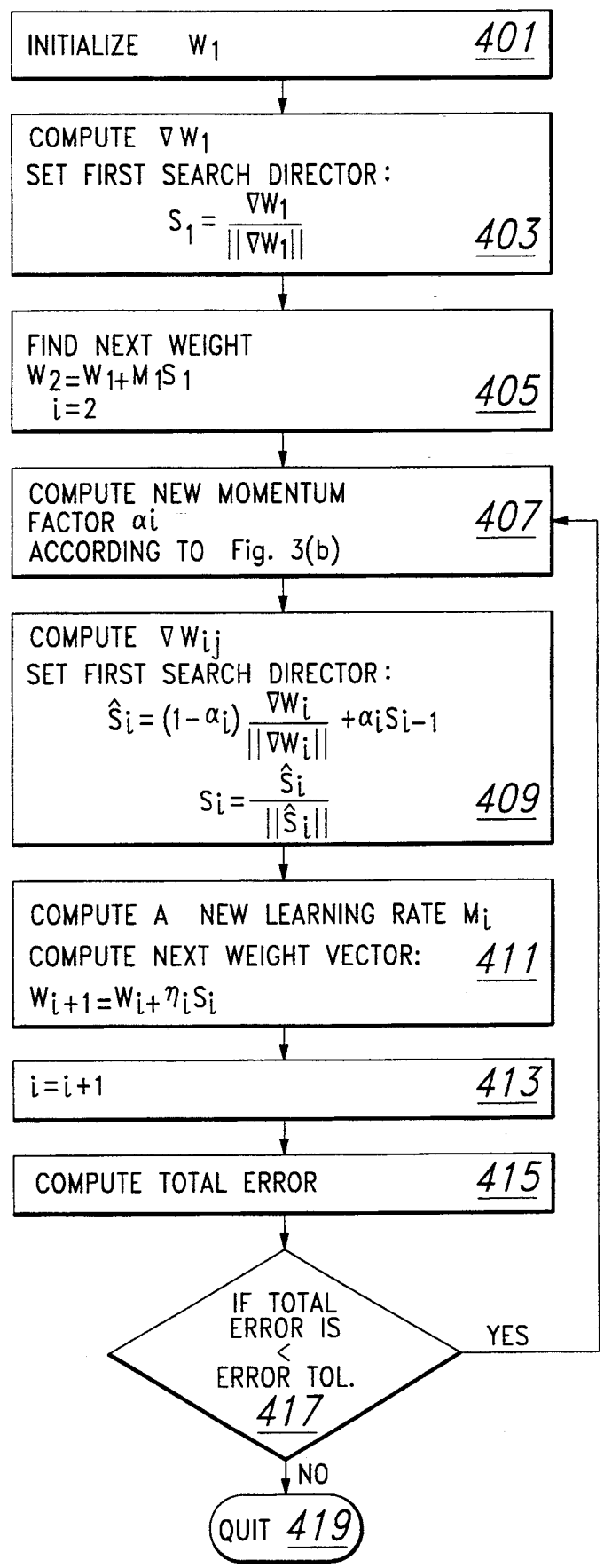
FIGS. 3(a) through 3(c) are flow charts depicting an embodiment of the method of the present invention.

The adaptive learning algorithm utilized in the present invention is based on the selection of two parameters: a momentum factor $\alpha$ and a directional learning rate $\eta$. The algorithm used is a version of the conjugate gradient algorithm shown and discussed by Strang, G., "Introduction to Applied Mathematics", Wellesley-Cambridge Press, 1986. The use of a momentum term in conjunction with the gradient descent direction was discussed by Rumelhart, et al discussed above. The present invention utilizes two related parameters referred to as the directional learning rate and the momentum factor to distinguish them from the terms used by Rumelhart, et al. The method of the present invention is depicted geometrically in FIG. 2. At step i of the method the weight vector has a particular value $W_i$. The gradient descent direction is provided by computing $\nabla W_i$ and normalizing the components by its Euclidean norm so that a unit length vector results. A new unit search vector is computed from this vector and the last search direction as shown based on the current directional momentum factor. A point along the new search direction is selected establishing a new directional learning rate. The momentum factor is adjusted and the method proceeds to the next step. The method is described more formally below and is shown in the flowchart of FIG. 3(a).

1. (Step 401) Start with an initial weight vector $W_1$.
2. (Step 403) Compute $\nabla W_1$ and set the first search direction (unit vector)

$$s_1 = \frac{\nabla W_1}{\|\nabla W_1\|}.$$

3. (Step 405) Find the next weight $W_2 = W_1 + \eta_1 s_1$ by computing the new directional learning rate $\eta_1$ (see below). Set i=2 and go to the next step.
4. (Step 407) Compute the new directional momentum factor $\alpha_i$ (see below).
5. (Step 409) Compute $\nabla W_i$ and set $$\hat{s}_i = (1 - \alpha_i) \frac{\nabla W_i}{\|\nabla W_i\|} + \alpha_i s_{i-1},$$

$$s_i = \frac{\hat{s}_i}{\|\hat{s}_i\|}.$$

6. (Step 411) Find the next weight vector $$W_{i+1} = W_i + \eta_i s_i$$

by computing the new directional learning rate $\eta_i$ (see below).

7. (Step 413) Set i=i+1. Continue steps 4–7 until a predetermined error tolerance (as computer in Step 415) is achieved, or alternatively, until a local minimum is reached (Step 417).

The method of the present invention is to find a search direction, and compute a point along the search direction to modify the weights. The search direction is a unit vector, computed as a mixture of the previous search direction and the unit vector in the direction of gradient descent. The directional learning rate $\eta_i$ at step i is computed by a search technique. A first version of the search technique is at each step i, begin with the double the previous directional learning rate $\eta_{i-1}$ and see if the total error function is reduced in Equation (10). If it is, then this is the learning rate for this step. If not, halve the directional learning rate and see if the error is reduced. This step is repeated until the error is reduced.

(a) Begin with double the previous directional learning rate $\eta_{i-1}$. Set $\eta^+ = 2\eta_{i-1}$.

(b) Compute error with $\eta^+$. If error is not reduced $$\eta^+ = 0.5\eta^+, \tag{16}$$

and repeat this step, unless $\eta <$ Epsilon, where Epsilon is some preset threshold value.

(c) Set the directional learning rate $\eta_i = \eta^+$.

A second variant of search for the directional learning rate is to begin the search with the directional learning rate at the previous value. If the error is reduced, attempt to reduce the error more by doubling the directional learning rate. If the error increases, go back to half the increase.

(a) Begin with current directional learning rate $\eta_i$. Set $\eta^- = 0.0$, $\eta^+ = \eta_{i-1}$.

(b) Compute error with $\eta^+$. If error is reduced, set $$\eta^- = \eta^+ \tag{17}$$

$$\eta^+ = 2\eta^+, \tag{18}$$

and repeat this step.

(c) Set $$\eta^+ = \tfrac{1}{2}(\eta^+ + \eta^-) \tag{19}$$

If error is not reduced with $\eta^+$, repeat this step.

(d) Set the directional learning rate $\eta_i = \eta^+$.

Selecting the directional learning rate $\eta_i$ at step i is an attempt to approximately find the point along the search direction $s_i$ with the most error reduction. A third line search method such as that presented and discussed by Dahl, E. D., "Accelerated Learning Using the Generalized Delta Rule", IEEE First International Conference on Neural Networks, pp. II-523–530, 1987 which uses a parabolic approximation scheme may also be employed in the method of present invention.

Figure 3B:
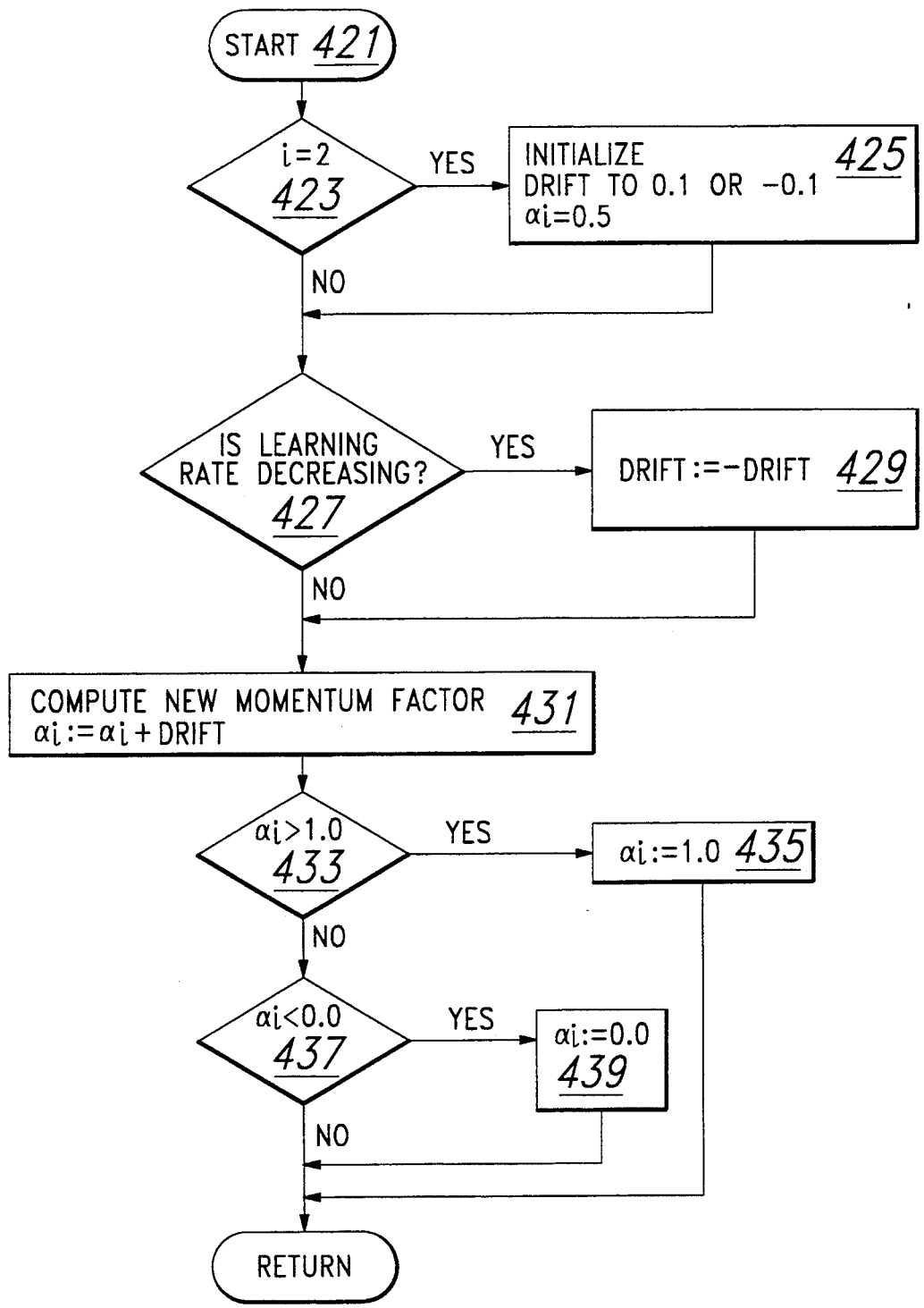

The heuristic used for adapting the momentum factor is shown in FIG. 3(b). The momentum factor is allowed to drift between 0.0 and 1.0 in steps of 0.1 beginning at 0.5 (Step 425). The momentum factor is either drifting up or down. If the directional learning rate is not decreasing, then the momentum factor is allowed to drift in its current direction. If the learning rate is decreasing (Step 427), then the momentum factor drift changes direction (Step 429). This can be accomplished by incrementing the momentum factor $\alpha_i$ in step 4 of the adaptive descent algorithm by +0.1 or −0.1 depending on whether the current drift direction is up or down (Step 431). In the embodiment discussed this value has a maximum of 1 and a minimum of 0 (Steps 433–439). The predetermined parameters for these values may, of course, be changed without departing from the spirit or scope of the present invention. Then in step 6, if the new directional learning rate is less than the previous directional learning rate, the direction of the momentum drift is reversed.

The purpose of the momentum heuristic is to allow the search direction to adapt to the curvature of the error surface. At areas of high curvature valleys of the error surface, the gradient descent direction tends to zigzag and would lead to small steps in error minimization, so smoothing by including some proportion of the previous descent direction can lead to faster descent.

The geometrical interpretation of reducing error by search in weight space leads to the algorithm presented here where the search direction and the distance moved in weight space along the search direction is allowed to adapt to the local nature of the error surface. It is noteworthy that the normalization of the descent direction produced by the backpropagation algorithm is used. Thus the definition of directional learning rate and momentum factor are different than in standard approaches such as that discussed by Rumelhart, et al. These can be related by taking the equation:

$$\nabla w_i = \eta \nabla w_i + \alpha \nabla w_{i-1} \qquad (20)$$

for step i. If $\eta$ and $\alpha$ are allowed to vary with i, then they can be computed from $\eta_i$ and $\alpha_i$ in the algorithm by $$\eta(i)j = \frac{\eta_i \alpha_i}{\|\hat{s}_i\| \cdot \|\nabla w_i\|}, \qquad (21)$$

$$\alpha(i) = \frac{\eta_i(1 - \alpha_i)}{\eta_{i-1} \|\hat{s}_i\|} \qquad (22)$$

One implementation of the present invention is set forth in Appendix A which is incorporated herein by reference. There is thus provided a fast method for adaptively determining the synaptic weights in a neural network.

Figure 3C:
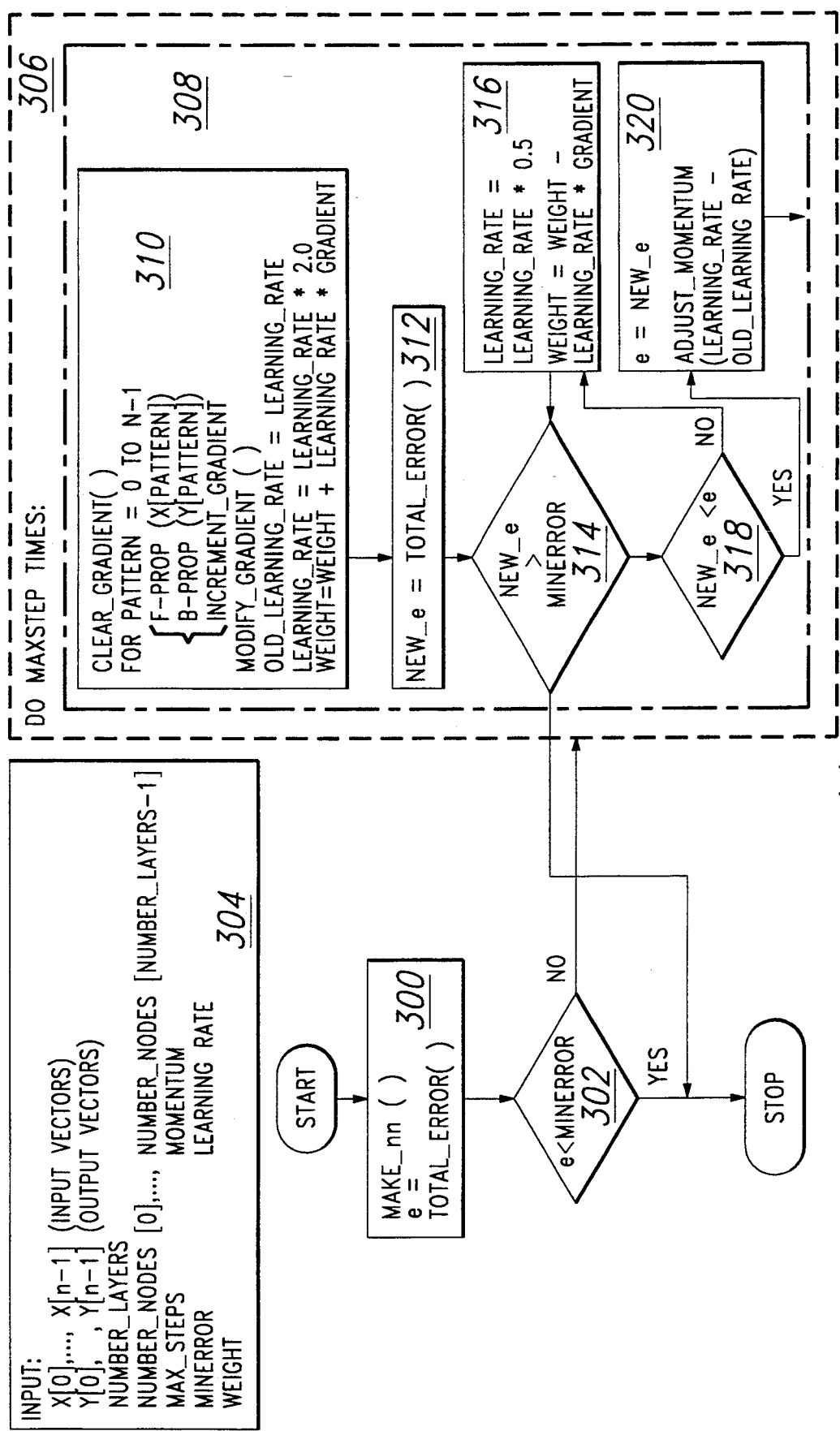

FIG. 3(c) is a flow chart of the implementation set forth in Appendix A. While there is not a direct correspondance with the method set forth above, Appendix A and FIG. 3(c) represent an alternative embodiment. A notable difference is in the terminology; "velocity" in Appendix A and FIG. 3(c) corresponds to "learning rate" in the discussion above, and "gradient" in the "weight=weight+velocity*gradient" statements of logic block 310 and logic block 316 corresponds to "search direction" in the equations above.

The first step is to create a neural network (Step 300). This step may be carried out in accordance with the "make_nn" function of Appendix A. However, it should be noted that the creation of a neural network is not a necessary step for the method. On the contrary, the method may be carried out on an existing network.

Logic block 306 corresponds to the seven step method for adaptive learning in a neural network described above. For example, "f_prop" of logic block 310 corresponds to equations (1) and (2), "b_prop" of logic block 310 corresponds to equation (3), "increment_gradient" corresponds to the determination of $\nabla W$ for a particular pattern, "modify_gradient" corresponds to the determination of search direction in Step 5, the "velocity" computation corresponds to the "learning rate" calculation in either of the search techniques, and the "weight" calculation corresponds to the weight vector calculation of step 6. Similarly, in logic blocks 300 and 312, and the error calculation and subsequent comparison in logic blocks 302 and 314, correspond to step 7 of the adaptive learning method described above. Furthermore, logic block 316, which is invoked if the error is not reduced (as in step b of the first search technique described above), the velocity, i.e., the learning rate, is halved as in equation 16, above. Finally, the "adjust_momentum" function of logic block 320 corresponds to the heuristic for adapting the momentum factor, described above.

Figure 4:
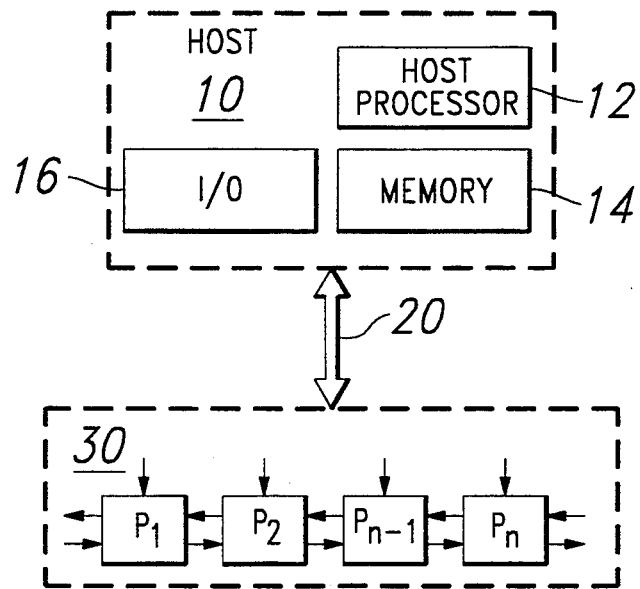
FIG. 4 is a block diagram of a computer system designed in accordance with the present invention.

FIG. 4 is a block diagram of the components of the apparatus of the present invention. The apparatus includes a host 10, bus 20 and processor network 30.

Host 10 is a standard processor-based digital computing device. Host 10 includes a processor 12 programmed to perform the calculations described above. Host 10 also includes a memory 14, which may be of any of a number of well known digital storage devices, and stores data used for the calculations of this invention, as well as instructions used by processor 12, for example, the software code of Appendix A. Host 10 further includes Input/Output devices 16, such as are associated with any number of well known peripheral devices, including devices whereby data may be input to the system by the user and output from the system for use by the user.

Bus 20 is used to communicate data, address and timing signals between host 10 and processor network 30 which may include one or more processors capable of carrying out instructions in accordance with the steps of the method described herein. There is thus provided a system for adaptively determining the weights between neurons in a neural network in accordance with the foregoing discussion.

While the method and apparatus of the present invention has been described with reference to the foregoing preferred embodiment and accompanying drawings, it should be apparent to those skilled in the art that changes and adaptations may be made without departing from the spirit and scope of the present invention as defined by the following claims.

APPENDIX A

```c
/*
  bpn.h
*/ define MAX_LAYERS    5    /* maximum number of layers */
define MAX_NEURONS  100   /* maximum number of neurons in a layer */
#define MAX_PATTERNS 500   /* maximum number of patterns */

/* Function prototypes */
void make_nn(int n_layers, int n_neurons[],int linear_in, int linear_out);
void init_nn(double random_weight_size,
             double x[], double y[], int n_patterns);
void output_neurons(int level, double (*sigmoid)(double));
void error_neurons(int level, double (*dsigmoid)(double));
void f_prop(double *input);
void b_prop(double *output);
void modify_gradient();
void clear_gradient();
void increment_gradient();
double error_metric(double *output);
double total_error();
void show_patterns();
void adjust_momentum(double diff);
void backprop(int maxsteps, double minerror);
void test(double *inputs, double *outputs);

double clif(double);
double dclif(double);
double linear(double);
double dlinear(double);

/*
  globals.h
*/ extern double out[MAX_LAYERS][MAX_NEURONS];   /* neuron output level */
extern double net[MAX_LAYERS][MAX_NEURONS];   /* neuron input level */
extern double error[MAX_LAYERS][MAX_NEURONS]; /* backpropagation error */ extern double inputs[MAX_PATTERNS][MAX_NEURONS];
extern double outputs[MAX_PATTERNS][MAX_NEURONS];

extern double weight[MAX_LAYERS][MAX_NEURONS][MAX_NEURONS];
/* connection weights */ extern double gradient[MAX_LAYERS][MAX_NEURONS][MAX_NEURONS];
/* gradient direction */ extern double inertia[MAX_LAYERS][MAX_NEURONS][MAX_NEURONS];
/* prior search direction */ extern int number_layers;                /* number of layers in net */
extern int number_neurons[MAX_LAYERS];   /* number of neurons for each layer */
extern int number_patterns;              /* number of patterns in training set */ extern double (*sigmoids[MAX_LAYERS])(double);
/* array of sigmoid functions */ extern double (*dsigmoids[MAX_LAYERS])(double);
/* array of derivative sigmoid functions */ extern double velocity;   /* (learning) velocity parameter */
extern double momentum;   /* (learning) momentum parameter */ extern double momentum_drift;  /* momentum drift parameter */
extern double velocity_expansion_factor;
extern double velocity_reduction_factor;
```

```c
extern int seed;

/*
  globals.c
*/ include "bpn.h"

double out[MAX_LAYERS][MAX_NEURONS];   /* neuron output level */
double net[MAX_LAYERS][MAX_NEURONS];   /* neuron input level */
double error[MAX_LAYERS][MAX_NEURONS]; /* backpropagation error */ double inputs[MAX_PATTERNS][MAX_NEURONS];
double outputs[MAX_PATTERNS][MAX_NEURONS];

double weight[MAX_LAYERS][MAX_NEURONS][MAX_NEURONS];   /* connection weights */
double gradient[MAX_LAYERS][MAX_NEURONS][MAX_NEURONS]; /* gradient direction */
double inertia[MAX_LAYERS][MAX_NEURONS][MAX_NEURONS];  /* prior search direction int number_layers;                    /* number of layers in net */
int number_neurons[MAX_LAYERS];       /* number of neurons for each layer */
int number_patterns;                  /* number of patterns in training set */ double (*sigmoids[MAX_LAYERS])(double);   /* array of sigmoid functions */
double (*dsigmoids[MAX_LAYERS])(double);  /* array of derivative sigmoid function
double velocity;   /* (learning) velocity parameter */
double momentum;   /* (learning) momentum parameter */ double momentum_drift;  /* momentum drift parameter */
double velocity_expansion_factor;
double velocity_reduction_factor;

int seed;

/*
  bp.c
*/ include <stdio.h>
include <math.h>
#include "bpn.h"
#include "globals.h"

void backprop(int maxsteps, double minerror)
{
        int layer, i, j, step, pattern;
        double e, new_e, old_velocity, *input, *output;

e = total_error();
        if( e < minerror) goto stop;

for (step = 0; step < maxsteps; step++)
           { clear_gradient();

for (pattern = 0; pattern < number_patterns; pattern++)
                   {
                        input = inputs[pattern];
                        output = outputs[pattern];
                        f_prop(input);
                        b_prop(output);
                        increment_gradient();

} modify_gradient();

old_velocity = velocity;
                velocity *= 2.0;
```

```
                for (layer = 0; layer < number_layers - 1; layer++)
                  for (i = 0; i < number_neurons[layer]+1; i++)
                    for (j = 0; j < number_neurons[layer+1]; j++)
                      weight[layer][i][j] += velocity * gradient[layer][i][j];

new_e = total_error();
                if (new_e < minerror) goto stop;

while ( new_e > e)
                  {
                        velocity *= 0.5;
                        if (velocity < 0.0000001) break;

for (layer = 0; layer < number_layers - 1; layer++)
                          for (i = 0; i < number_neurons[layer]+1; i++)
                            for (j = 0; j < number_neurons[layer+1]; j++)
                              weight[layer][i][j] -=
                                  velocity * gradient[layer][i][j];
                        new_e = total_error();
                        if (new_e < minerror) goto stop;
                  } e = new_e;
                adjust_momentum(velocity - old_velocity);

if (step % 10 == 0)
                   printf(" N = %d, V = %f, M = %f, E = %f\n",
                          step, velocity, momentum, e);

}
    stop: printf("Stopped\n");
          printf("N = %d, E = %f\n", step,  e);
          show_patterns();
}
/*
  aux.c
*/ include <stdio.h>
include <math.h>
#include "bpn.h"
#include "globals.h"

double clif (double x)
{
        return x / (2.0 * fabs(x) + 1.0) + 0.5;
} double dclif (double x)
{
        double y;

y = (2.0 * fabs(x) + 1.0);
        return 1.0 / (y * y);
} double linear (double x)
{
        return x;
} double dlinear (double x)
{
        return 1.0;
} void make_nn(int n_layers, int n_neurons[], int linear_in, int linear_out)
{
        int i;

number_layers = n_layers;
        --n_layers;
```

```
        number_neurons[0] = n_neurons[0];
        sigmoids[0] = (linear_in == 1) ? linear : clif;
        dsigmoids[0] = (linear_in == 1) ? dlinear : dclif;

for (i = 1; i < n_layers; i++)
          {
                number_neurons[i] = n_neurons[i];
                sigmoids[i] = clif;
                dsigmoids[i] = dclif;
          } number_neurons[n_layers] = n_neurons[n_layers];
        sigmoids[n_layers] = (linear_out == 1) ? linear : clif;
        dsigmoids[n_layers] = (linear_out == 1) ? dlinear : dclif;

} void init_nn(double random_weight_size, double x[], double y[], int n_patterns)
{
        int layer, i, j, n, pattern;
        double r;

momentum_drift = 0.1;   /* momentum drift parameter */
        velocity_expansion_factor = 2.0;
        velocity_reduction_factor = 0.5;

number_patterns = n_patterns;

srand(seed);

for (layer = 0; layer < number_layers-1; layer++)
           for (i = 0; i < number_neurons[layer]+1; i++)
              for (j = 0; j < number_neurons[layer+1]; j++)
                 {
                        r = (0.5 - ((double) rand())/32767.0) * 2.0;
                        weight[layer][i][j] = random_weight_size * r;
                        inertia[layer][i][j] = 0.0;
                 } for (pattern = 0; pattern < number_patterns; pattern++)
           {
                n = number_neurons[0];
                for (i = 0; i < n; i++)
                   inputs[pattern][i] = x[n*pattern+i];

n = number_neurons[number_layers-1];
                for (i = 0; i < n; i++)
                   outputs[pattern][i] = y[n*pattern+i];
           }
} void output_neurons(int layer, double (*sigmoid)(double))
{
        int layer_1, i, j;
        double sum;

layer_1 = layer - 1;
        for (j = 0; j < number_neurons[layer]; j++)
           {
                sum = 0.0;
                for (i = 0; i < number_neurons[layer_1]; i++)
                   sum += weight[layer_1][i][j] * out[layer_1][i];
                sum += weight[layer_1][number_neurons[layer_1]][j];
                net[layer][j] = sum;
                out[layer][j] = (*sigmoid)(sum);
           }
} void error_neurons(int layer, double (*dsigmoid)(double))
{
        int layer_1, i, j;
        double sum;
```

```
        layer_1 = layer+1;
        for (i = 0; i < number_neurons[layer]; i++)
            {
                sum = 0.0;
                for (j = 0; j < number_neurons[layer_1]; j++)
                    sum += weight[layer][i][j] * error[layer_1][j];
                error[layer][i] = (*dsigmoid)(net[layer][i]) * sum;
            }
} void f_prop(double *inputs)          /* inputs to the net */
{
        int i, layer;

for (i = 0; i < number_neurons[0]; i++)
            {
                net[0][i] = inputs[i];
                out[0][i] = (*sigmoids[0])(inputs[i]);

}
        out[0][number_neurons[0]] = 1.0;
        for (layer = 1; layer < number_layers; layer++)
            output_neurons(layer, sigmoids[layer]);
} void test(double *inputs, double *outputs)
{
        int i, layer;
        f_prop(inputs);
        layer = number_layers-1;
        for (i = 0; i < number_neurons[layer]; i++)
            outputs[i] = out[layer][i];
} void b_prop(double *outputs)   /* target outputs for the net */
{
        int i, layer;

layer = number_layers-1;
        for (i = 0; i < number_neurons[layer]; i++)
            error[layer][i] =
               (outputs[i]-out[layer][i]) * (*dsigmoids[layer])(net[layer][i]);
        for (layer = layer-1; layer > 0; --layer)
            {
                error_neurons(layer, dsigmoids[layer]);
            }
} double error_metric(double *output)
{
        double e, sum;
        int layer, i;

layer = number_layers-1;
        sum = 0.0;
        for (i = 0; i < number_neurons[layer]; i++)
            {
                e = output[i] - out[layer][i];
                sum += (e * e);
            }
        return sum / ((double) number_neurons[layer]);
} double total_error()
{
        double e, *input, *output;
        int pattern;

e = 0.0;
        for (pattern = 0; pattern < number_patterns; pattern++)
            {
```

```
                input = inputs[pattern];
                output = outputs[pattern];
                f_prop(input);
                e += error_metric(output);
            }
            e /= ((double) number_patterns);
            return e;
    } void show_patterns()
    {
            double *input, *output;
            int pattern, i;

for (pattern = 0; pattern < number_patterns; pattern++)
                {
                    input = inputs[pattern];
                    output = outputs[pattern];
                    f_prop(input);

printf("P = %d\n", pattern);
                    printf("  In = ");
                    for (i = 0; i < number_neurons[0]; i++)
                       printf("%f ", net[0][i]);
                    printf("\n Out = ");
                    for (i = 0; i < number_neurons[number_layers-1]; i++)
                       printf("%f ", out[number_layers-1][i]);
                    printf("\n          (");
                    for (i = 0; i < number_neurons[number_layers-1]; i++)
                       printf("%f ", output[i]);
                    printf(")\n");

}
    } void adjust_momentum(double diff)
    {
            if (diff < 0)
               momentum_drift = -momentum_drift;
            momentum += momentum_drift;
            if (momentum > 0.9) momentum = 0.9;
            if (momentum < 0.1) momentum = 0.1;
    } void increment_gradient()
    {
            int layer, i, j;

for (layer = 0; layer < number_layers-1; layer++)
              for (i = 0; i < number_neurons[layer]+1; i++)
                for (j = 0; j < number_neurons[layer+1]; j++)
                   gradient[layer][i][j] += out[layer][i] * error[layer+1][j];
    } void clear_gradient()
    {
            int layer, i, j;

for (layer = 0; layer < number_layers-1; layer++)
              for (i = 0; i < number_neurons[layer]+1; i++)
                for (j = 0; j < number_neurons[layer+1]; j++)
                   gradient[layer][i][j] = 0.0;
    } void modify_gradient()
    {
            double norm, scale, g;
            int layer, i, j;

norm = 0.0;
            for (layer = 0; layer < number_layers-1; layer++)
              for (i = 0; i < number_neurons[layer]+1; i++)
                for (j = 0; j < number_neurons[layer+1]; j++)
                   {
                       g = gradient[layer][i][j];
```

```c
                              norm += g * g;
            } norm = sqrt(norm);
        scale = momentum/norm;

norm = 0.0;
        for (layer = 0; layer < number_layers-1; layer++)
          for (i = 0; i < number_neurons[layer]+1; i++)
            for (j = 0; j < number_neurons[layer+1]; j++)
            {
                        g = (1.0-momentum) * inertia[layer][i][j]
                            + scale * gradient[layer][i][j];
                        gradient[layer][i][j] = g;
                        norm += g * g;
            } norm = sqrt(norm);
        for (layer = 0; layer < number_layers-1; layer++)
          for (i = 0; i < number_neurons[layer]+1; i++)
            for (j = 0; j < number_neurons[layer+1]; j++)
            {
                        gradient[layer][i][j] /= norm;
                        inertia[layer][i][j] = gradient[layer][i][j];
            }
}
/*
  test.c
*/ include <stdio.h>
include <math.h>
#include "bpn.h"
#include "globals.h"

double xor_in[] =
{
        0.0, 0.0,
        1.0, 0.0,
        0.0, 1.0,
        1.0, 1.0
};
double xor_out[] =
{
        0.0,
        1.0,
        1.0,
        0.0
};

double n_code_4[] =
{
        1.0, 0.0, 0.0, 0.0,
        0.0, 1.0, 0.0, 0.0,
        0.0, 0.0, 1.0, 0.0,
        0.0, 0.0, 0.0, 1.0
};

int main(void)
{ static int n_layers = 3;
        static int n_neurons[3] = {2, 4, 1};
        static int n_patterns = 4;

seed = 2;

velocity = 1.0;  /* (learning) velocity parameter */
        momentum = 0.5;  /* (learning) momentum parameter */
        momentum_drift = 0.1;
```

```
    make_nn(n_layers, n_neurons, 1, 1);
    init_nn(0.5, xor_in, xor_out, n_patterns);
    backprop(1001, .00001);

n_neurons[0] = 4;
    n_neurons[1] = 3;
    n_neurons[2] = 4;
    velocity = 1.0;   /* (learning) velocity parameter */
    momentum = 0.5;   /* (learning) momentum parameter */

/*  make_nn(n_layers, n_neurons, 1, 0);
    init_nn(0.5, n_code_4, n_code_4, n_patterns);
    backprop(1001, .00001); */

}
```

I claim:

1. A method of controlling a computer to adjust a neural network, said computer including an artificial neural network having multiple layers including an input layer and an output layer, each layer having a plurality of neurons, each neuron in a first layer is connected to each neuron in a second layer by a weight, said weights organized into a weight vector, comprising the steps of:

assigning in a memory in said computer, a first memory location for storing a first learning rate, a second memory location for storing a momentum factor, a memory block for storing said weight vector, and a third memory location for storing a second learning rate;

selecting said first learning rate, said momentum factor, and said weight vector;

storing said first learning rate, said momentum factor, and said weight vector into said first memory location, said second memory location and said memory block;

saving said first learning rate in said second learning rate by storing said first learning rate into said third memory location;

obtaining the total error from said neural network using said weight vector;

using a search technique to adjust said first learning rate to adjust said weight vector;

updating said first memory location and said memory block;

adapting said momentum factor using said first learning rate and said second learning rate by computing the change in the learning rate by subtracting said first learning rate from said second learning rate and allowing said momentum factor to drift in a direction dependent upon said change in the learning rate;

meeting a predetermined convergence criterion; and updating said weight vector to said artificial neural network.

2. The method of adjusting a neural network to learn as defined in claim 1 wherein said selecting step further comprises the step of randomly selecting said weights, initializing said first learning rate to 1.0 and said momentum factor to 0.5.

3. The method of adjusting a neural network to learn as defined in claim 1, wherein said saving step further comprises step:

obtaining a total error from said neural network using said weight vector; and said using step further comprises the steps:

increasing said first learning rate if said total error produced using said weight vector is reduced, and reducing said first learning rate if said total error produced using said weight vector is not reduced.

4. The method of claim 1 wherein said adapting step further comprises reversing said direction when said momentum factor is equal to an upper limit or a lower limit.

5. The method of claim 4 wherein said upper limit is 1.0 and said lower limit is 0.0.

6. A method of controlling a computer to adjust a neural network, said computer including an artificial neural network having multiple layers including an input layer and an output layer, each layer having a plurality of neurons, each neuron in a first layer is connected to each neuron in a second layer by a weight, said weights organized into a weight vector, comprising the steps of:

assigning in said computer a first memory location for storing a first learning rate, a second memory location for storing a momentum factor, a memory block for storing said weight vector, a third memory location for storing a second learning rate;

selecting said first learning rate, momentum factor, and said weight vector;

storing said first learning rate, said momentum factor, and said weight vector into their respective memory locations assigned in said assigning step;

utilizing an error function and a set of test patterns to compute a total error for said neural network using said weight vector;

designating said first learning rate to said second learning rate by storing said first learning rate into said third memory location;

using a search technique to adjust said first learning rate as a function of said total error by allowing said momentum factor to drift in a direction dependent upon said first learning rate and said second learning rate;

reversing said direction if said momentum factor is equal to an upper limit or a lower limit;

adapting said momentum factor based upon said second learning rate and said first learning rate;

utilizing said first learning rate and said momentum factor to adjust said weight vector;

meeting a predetermined convergence criterion; and updating said weight vector to said artificial neural network.

7. The method of claim 6 wherein said selecting step further comprises selecting said weights using a random number generator, initializing said learning rate to 1.0 and said momentum factor to 0.5.

8. The method of adjusting a neural network as defined in claim 6, wherein said designating step comprises the step of increasing said first learning rate if the error produced using said weight vector is reduced, and the step of reducing said first learning rate if the error produced using said weight vector is not reduced.

9. The method of claim 6 wherein said upper limit is 1.0 and said lower limit is 0.0.

10. An improved neural network adjusted to match a known set of test patterns comprising:

a neural network having multiple layers including an input layer and an output layer, each layer having a plurality of neurons, each of said plurality of neurons in a first layer connected to each of said plurality of neurons in a second layer by a weight, said weights organized into a weight vector;

a memory storing a set of signals associated with said known set of test patterns, a first learning rate, a second learning rate, a momentum factor, and said weight vector; and processor means coupled to said neural network and said memory for comparing a set of signals from said output layer to said set of signals associated with said known set of test patterns to determine errors; said processor means if said errors exceed a predetermined error convergence criteria replacing in said memory said second learning rate with said first learning rate, readjusting said first learning rate and adjusting said momentum factor by a predetermined incremental value and multiplying said predetermined incremental value by a negative value if said first learning rate is increasing or if said momentum factor is equal to an upper limit or a lower limit, and readjusting said weight vector stored in said memory using the readjusted first learning rate and the adjusted momentum factor.

* * * * *